May 31, 1932.  E. R. EVANS  1,860,666

MOTOR VEHICLE BRAKE

Original Filed May 11, 1925  2 Sheets-Sheet 1

INVENTOR.
EDWIN R. EVANS

BY
Whittemore Hulbert Whittemore
& Belknap ATTORNEYS

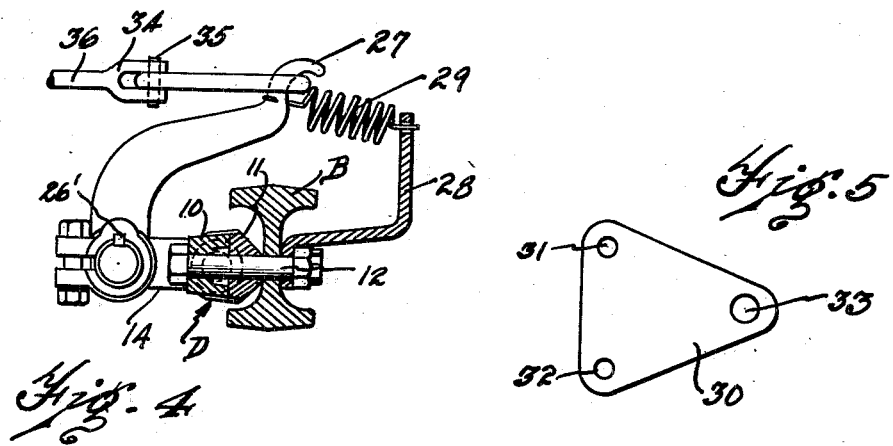

Patented May 31, 1932

1,860,666

UNITED STATES PATENT OFFICE

EDWIN R. EVANS, OF DETROIT, MICHIGAN

MOTOR VEHICLE BRAKE

Application filed May 11, 1925, Serial No. 29,587. Renewed July 30, 1930.

The invention relates to motor vehicles and more particularly to a mechanism for applying a braking force to the wheels of the vehicle. One of the objects of the invention is to provide an equalizer mounted on the axle of the vehicle whereby a braking construction is afforded which is of simple construction comprising relatively few parts. A further feature of the invention resides in providing an equalized brake mechanism affording a direct action. A further feature is the provision of an equalizer mounted on the front axle of a vehicle.

With these and other objects in view, the invention resides in the novel features of construction and combination and arrangements of parts as more fully hereinafter described and claimed.

Referring to the drawings:—

Figure 4 is a sectional elevation view through 4—4 of Figure 2 showing the equalizing link in operative position;

Figure 5 is a plan view showing the equalizing link;

Figure 6 is a view corresponding to Figure 1 showing a modified construction; and Figure 7 is a side elevation view of Figure 6.

Figure 1:
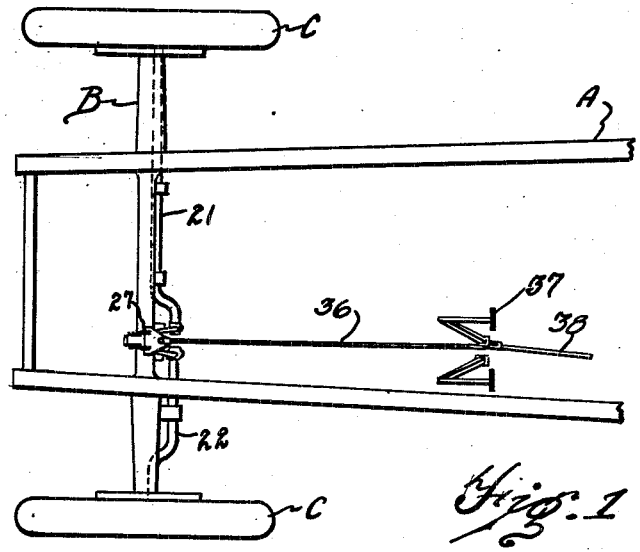
Figure 1 represents a fragmentary plan view of the forward part of a motor vehicle chassis showing my equalizer applied thereto.
Figure 2:
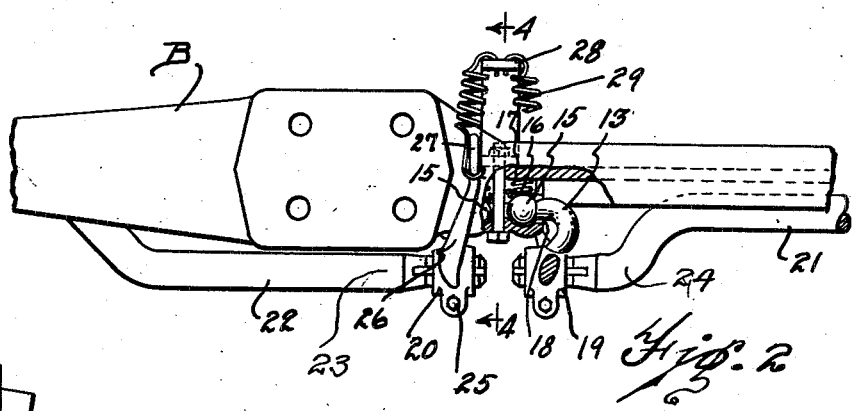
Figure 2 is a fragmentary plan view of the front axle of the vehicle showing the mounting for the equalizer.

Referring to the drawings, in which like reference characters indicate corresponding parts, reference character A indicates the chassis of a motor vehicle having the axle B which, for purposes of illustration, is shown as the front axle. C indicates the usual steering wheels mounting the axle B. These parts may be of the usual or any preferred construction. Mounted on the axle B at a suitable point intermediate the ends thereof is a housing D which, as shown in Figure 4, may be formed of the parts 10 and 11 bolted together and secured in fixed relation to the axle B by suitable fasteners or bolts 12. The housing D is adapted to receive the ends of the pivoted arm members 13 and 14 which are directed inwardly toward the axle preferably terminating in a ball 15 forming one portion of a swivel joint in combination with the housing D. Each of the balls 15 carried by the pivot arms is adapted to be seated in a socket 16 which by reason of a spring 17 is of a yieldable character. The housing D at the point of entrance of the pivot arms is preferably provided with the openings 18 somewhat larger than the pivot arms passing therethrough in order to provide for freedom of movement of the pivot arms about their points of pivot formed by the ball and socket joint. The pivot arms 13 and 14 are carried by sleeved members 19 and 20 respectively engageable with cam rods 21 and 22 which extend substantially longitudinally of the axle B and in opposite directions for actuating suitable cams (not shown) for applying the brakes of the respective opposed wheels mounting the axle in accordance with the usual practice. It will be noted that the cam rods are universally supported at their inner ends on one side of the axle and are cranked or bent for purposes of clearance to extend around portions of the axle and terminate at their outer ends by being supported by the brakes carried by the wheels C substantially beneath the outer ends of the axle. For rigidly securing the sleeved members 19 and 20 to the portions 23 and 24 of the cam rods, the latter portions being offset from the axle, suitable fasteners or bolts 25 may be provided. If desired, the sleeve members may be further connected with the offset portions of the cam rods by keying the sleeve members with the cam rods as indicated at 26'. The sleeve members are preferably integrally formed with the upstanding actuating arms 26 which preferably extend forwardly above the wheel C, the arms 26 terminating in a hook portion 27. 28 indicates a bracket fixed to the axle as by the bolt 12. Springs 29 are provided for engagement with the bracket 28 and the respective actuating arms or cam rod levers 26. The construction is such that the pivot points of the pivot arms 13 and 14 lie substantially in alignment with the outer ends of the cam rods 21 and 22.

For applying an equalizing force to the actuating arms or cam rod levers 26, an equalizing link 30 is provided. This link may be formed with a pair of openings 31 and 32 adapted to receive the hook portions 27 of the levers 26. A third opening 33 is is also provided for pivotal connection as by a yoke 34 and pin 35 with an actuating rod 36. The latter rod may extend to a suitable point actuation by a control member such as the usual brake pedal or the like 37. 38 indicates a second control rod which may be simultaneously actuated by the pedal 37, the rod 38 leading to any suitable brake controlling mechanism in combination with the rear wheels of the vehicle (not shown). The latter mechanism may be identical with that shown in connection with the front wheels of the vehicle or may be any other preferred or suitable construction.

As shown in Figure 1, the cam rods 21 and 22 preferably extend substantially longitudinally of the axle B close adjacent the same and preferably in the space provided by the projecting upper and lower flanges of the axle B which as shown in Figure 4, may be of substantially I-shape in cross section.

In operation of the parts as described thus far, when it is desired to apply an equalizing braking force to the opposed wheel C carried by the axle B, the operator actuates the pedal 37 to move the single actuating rod 36. The movement of the rod 36 is transmitted through the equalizing link 30 so as to act on the actuating arms or cam rod levers 26, whereby the cam rods 21 and 22 are rocked about their pivotal points formed by the balls 15 to apply an equalizing braking force to the wheel C. During this movement of the arms 26 the springs 29 are placed under a tension so that upon release of the pedal 37 the springs 29 will act to return the parts to the original position, thus relieving the braking of the wheels. Should there be a tendency for one of the arms 26 to resist movement by the equalizing link 30 more than the other arm, the link 30 will adjust itself by reason of the three-point pivotal connections so as to equalize the braking force applied through the arms 26 to the respective cam rods 21 and 22. One of the features of my invention resides in the relation of the points 31 and 32 with the point 33, the arrangement being such that should one of the cam rods fail, as by a fracture, or breaking of one of the parts, connected to operate one of the cam rods, the equalizing link 30 will move only slightly a sufficient distance to align the actuating rod 36 and the point 30 with the other of the points 31 and 32, thus applying a braking force to the other of the wheels. It will be noted that the pivotal points of the equalizing points are so arranged that very little movement of the equalizing link is necessary to adjust the same either in ordinary usage of applying on equalizing force to both of the wheels or in applying all of the force to one of the wheels in case of failure of the other as aforesaid.

Figure 3:
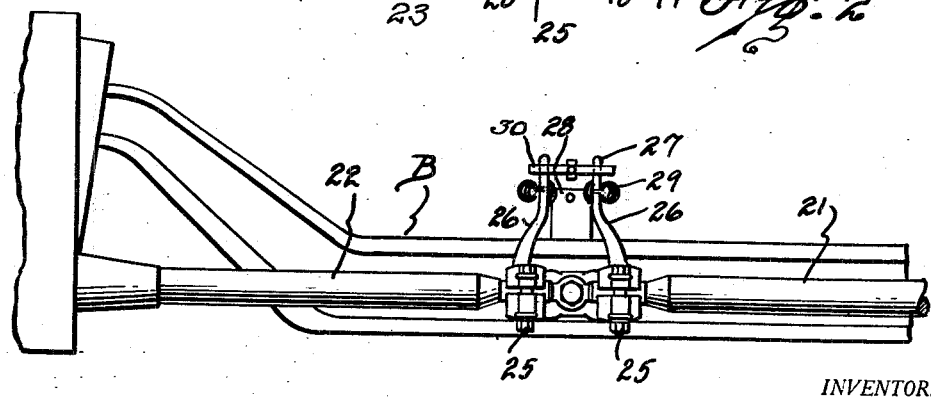
Figure 3 is an elevation view of the front axle and the equalizer mechanism.

Instead of providing a type of vehicle brake as shown in Figure 3 where the cam rods enter the lower portion of the brake drum, my invention may be readily adapted to other types of vehicle brakes where the cam rods enter and extend in various positions with respect to the brake drums which are ordinarily associated with the braking mechanism of vehicle wheels. For example, in Figures 6 and 7, I have shown a construction in which the cam rods 21ᵃ and 22ᵃ are positioned for engagement adjacent the upper portion of the vehicle brake drums. In adapting my invention to this construction, the cam rods 21ᵃ and 22ᵃ may be actuated or rocked through suitable levers 39 adapted to be actuated through connecting links 40 by the levers 41 and 42 respectively. The latter levers are carried by shafts 43 and 44 which are adapted to receive an equalized braking force from an actuating rod 36′ by reason of an equalizing mechanism such as shown in connection with the construction described in Figure 1. In this modified construction, the operation of the equalizing device may be substantially the same as that aforesaid, the cam rods 21ᵃ and 22ᵃ being actuated from the shafts 43 and 44 by reason of the link 40 connecting the levers 39 with the levers 41 and 42 respectively.

While I have illustrated my invention in connection with the front axle of a motor vehicle it is apparent that it is equally adapted for use in connection with the rear axle for applying an equalized braking force to the rear wheels. Furthermore, various other forms of equalizing devices may be substituted for the one illustrated in the drawings and I, therefore, do not limit my invention to the particular construction shown apart from the appended claims. Also, various other linkage and mechanisms may be used to connect the equalizer with the wheel brakes.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. In combination with a motor vehicle having an axle, and a pair of opposed wheels mounting said axle, an equalizer connected to the axle comprising a housing, oppositely extending rods having the opposed ends thereof provided with arms pivoted in said housing for rockably mounting said rods, means for applying a braking force to the wheels from said rods respectively, and means associated with the equalizer for applying an equalizing force to said oppositely extending rods.

2. In combination with a motor vehicle having an axle and a pair of opposed wheels mounting said axle, a pair of spaced rods having their opposed ends provided with arms pivotally carried by the axle for rockably mounting said rods and having their other ends extending substantially longitudinally of the axle toward the wheels respectively for applying a braking force thereto, and means for rocking said rods about said pivots.

3. In combination with a motor vehicle having an axle and a pair of opposed wheels mounting said axle, a pair of spaced rods having their opposed ends provided with arms pivotally carried by the axle for rockably mounting said rods and having their other ends extending substantially longitudinally of the axle toward the wheels respectively for applying a braking force thereto, and means for applying an equalizing force to said rods for braking the wheels equally.

4. In combination with an axle mounting a pair of opposed wheels, a pair of rods extending substantially longitudinally of said axle and connected to apply a braking force to the wheels, each of said rods having a pivoted arm directed inwardly toward the axle for pivotally mounting one end of the rod, and means for rocking said rods on the said pivots.

5. In combination with an axle mounting a pair of opposed wheels, a pair of rods extending substantially longitudinally of said axle and connected to apply a braking force to the wheels, each of said rods having a pivoted arm directed inwardly toward the axle for pivotally mounting one end of the rod, an actuating arm carried by each of said rods and means for applying movement to said actuating arms for rocking said rods.

6. In combination with an axle mounting a pair of opposed wheels, a pair of rods extending substantially longitudinally of said axle and connected to apply a braking force to the wheels, each of said rods having a pivoted arm directed inwardly toward the axle for pivotally mounting one end of the rods, and resilient means tending to urge said rods to a non-braking position.

7. In combination with a vehicle, a pair of oppositely extending rods for applying a braking force to the wheels mounting the vehicle, each of said rods having an arm pivotally mounting said rods, an actuating rod, an equalizer link pivoted to said arms and adapted to be pivotally engaged at a third point by said actuating rod, said pivotal points being arranged so that in the event of failure of one of said rods the other may be actuated through said link.

8. In combination with an axle mounting a pair of opposed wheels, a pair of rods connected to apply a braking force to the wheels, a pair of arms swivelly journaled on the axle, means for rigidly connecting the said arms to the ends of the said rods and means for equally applying force to the said arms, for rocking said rods in a plane at right angles to said axle.

9. In combination with an axle mounting a pair of opposed wheels, a pair of rods connected to apply a braking force to the wheels, a pair of arms rigidly secured to the rods for rocking said rods in a plane at right angles to said axle, means for pivotally mounting said arms on said axle, an equalizer connected to said arms, and means for applying movement to said equalizer to rock said arms.

10. In combination with an axle mounting a pair of opposed wheels, a pair of rods connected to apply a braking force to the wheels, a pair of crank arms, means for pivotally mounting one end of each of the said crank arms on the axle, means for connecting the said rods to the crank arms intermediate the ends thereof, and means for applying an equalized force to the other ends of the crank arms.

11. In combination with an axle mounting a pair of opposed wheels, a pair of rods for applying a braking force to said wheels, an equalizer for applying an equalizing force to said rods, and a pair of crank arms rigidly secured to the rods pivotally mounted on said axle for transmitting movement from said equalizer to said rods.

12. In combination with an axle mounting a pair of opposed wheels, a pair of crank arms pivotally mounted on said axle for movement in a plane at right angles thereto, means for applying an equalized force to said crank arms to rock the same and rods rigidly secured to the arms for transmitting the movement of said crank arms to the wheels to apply a braking force thereto.

13. In combination with an axle mounting a pair of opposed wheels, a pair of rods connected to apply a braking force to the wheels, each of said rods having a pivoted arm rigidly secured thereto for rockably mounting said rods, and means for rocking said rods.

14. In combination with an axle mounting a pair of opposed wheels, a pair of rods arranged parallel with said axle and connected to apply a braking force to the wheels, each of said rods having an arm rigidly secured thereto and pivoted to the axle for rockably supporting said rods, and means for rocking said rods.

15. In combination with a motor vehicle having an axle and a pair of opposed wheels mounting said axle, a pair of spaced rods having their opposed ends provided with arms pivotally carried by the axle for rockably mounting said rods and having their other ends extending substantially longitudinally of the axle towards the wheels respectively for applying a braking force thereto, and a single pull rod operatively connected with both of said rods for rocking said rods about said pivots.

16. In combination with a motor vehicle having an axle and a pair of opposed wheels mounting said axle, a pair of spaced rods having their opposed ends provided with arms pivotally carried by the axle for rockably mounting said rods and having their other ends extending substantially longitudinally of the axle towards the wheels respectively for applying a braking force thereto, a connecting member between said rods and a pull rod operatively connected with said connecting member for rocking said rods about said pivots.

17. In combination with an axle mounting a pair of opposed wheels, a pair of rods extending substantially longitudinally of said axle and connected to apply a braking force to the wheels, each of said rods having a pivoted arm directed inwardly toward the axle for pivotally mounting one end of the rod, an actuating arm carried by each of said rods, and a single pull rod operatively connected with both of said actuating arms for rocking said rods about said pivots.

18. In combination with an axle mounting a pair of opposed wheels, a pair of rods extending substantially longitudinally of said axle and connected to apply a braking force to the wheels, a double arm lever secured to the inner end of each of said rods, one arm of each of said levers being pivotally supported on the axle, and a pull rod operatively connected with the other arms of said levers for rockably actuating said rods.

19. In combination with an axle mounting a pair of opposed wheels, a pair of rods connected to apply a braking force to the wheels, each of said rods including an arm rigid with respect thereto for rockably supporting said rod on the axle and a single means connected to both of said rods for rockably actuating said rods.

20. In combination with an axle mounting a pair of opposed wheels, a pair of brake actuating shafts connected to apply a braking force to the wheels, a pair of crank arms, means for pivotally mounting one end of each of said crank arms on the axle, means connecting said shafts to the crank arms intermediate the ends thereof, and means for applying a brake actuating force to the other ends of said crank arms for rocking said shafts.

21. In combination with a motor vehicle having an axle substantially I-shaped in vertical section, a wheel supporting one end of said axle, a brake for said wheel, a brake actuating cross shaft supported at its outer end by said brake, a pivotal bearing support for the inner end of said shaft on said axle in a channel portion thereof, said shaft being bent to extend beneath the wheel-supported end of said axle, an actuating arm secured to the inner end of said shaft and curved to extend above and over said axle and means connected to said actuating arm at a point above said axle for rocking said shaft.

22. In combination with a motor vehicle having a front axle and a pair of opposed front wheels mounting said axle, brakes for said wheels, a pair of rockable brake actuating shafts having their outer ends supported by said brakes beneath the outer ends of said axle and having their inner ends universally supported by said axle on one side thereof, said shafts being cranked to extend around portions of said axle, a pair of lever arms rigid with the inner ends of said shafts, and a single pull rod operatively connected with said lever arms at a point above said axle for rocking said shafts.

23. In combination with a motor vehicle having an axle and a pair of opposed wheels mounting said axle, brakes for said wheels, a pair of rockable brake actuating shafts having their outer ends supported by said brakes below the ends of said axle and having their inner ends universally supported on one side of said axle closely adjacent each other, lever arms rigid with the inner ends of said shafts and a single tension transmitting member extending to a point adjacent said axle for operative connection with said lever arms for rocking said shafts.

24. In combination with a motor vehicle having an axle and a pair of wheels mounting said axle, brakes for said wheels, a pair of rockable brake actuating shafts extending substantially longitudinally of said axle and having their outer ends supported by said brakes below the ends of said axle, means secured to one side of said axle for universally supporting the inner ends of said shafts, lever arms rigid with the inner ends of said shafts, and a single tension transmitting member extending longitudinally of the vehicle to a point above said axle for operative connection with said lever arms for applying a braking force to said brakes by rocking said shafts.

25. In combination with a motor vehicle having an axle and a pair of wheels mounting said axle, brakes for said wheels, a pair of rockable brake actuating shafts having their outer ends supported by said brakes and having their inner ends independently and universally supported on said axle closely adjacent each other, lever arms rigid with the inner ends of said shafts, a connecting member between said lever arms engaging each of said lever arms at points in substantially vertical planes longitudinal of the vehicle passing through the centers of the universal supports for the inner ends of said shafts, and a single tension transmitting member connected to said connecting member for rockably actuating said shafts.

26. In combination with a motor vehicle having an axle and a pair of opposed wheels mounting said axle, brakes for said wheels, a pair of rockable brake actuating shafts having their outer ends supported by said brakes below the ends of said axle, universal bearing supports carried by said axle for mounting the inner ends of said shafts, lever arms rigid with the inner ends of said shafts, a single tension transmitting member, a cross member engaged by said tension transmitting member, said cross member engaging said lever arms at points substantially in parallel vertical planes passing through the centers of the universal bearing supports for the inner ends of said shafts, whereby said shafts are free to move angularly independent of a brake actuating force transmitting through said tension member for rockably actuating said shafts.

In testimony whereof I affix my signature.

EDWIN R. EVANS.